July 6, 1926.  1,591,645
R. RAFN
PROCESS FOR THE TREATMENT OF LIQUIDS CONTAINED IN CLOSED VESSELS
Filed Nov. 3, 1923
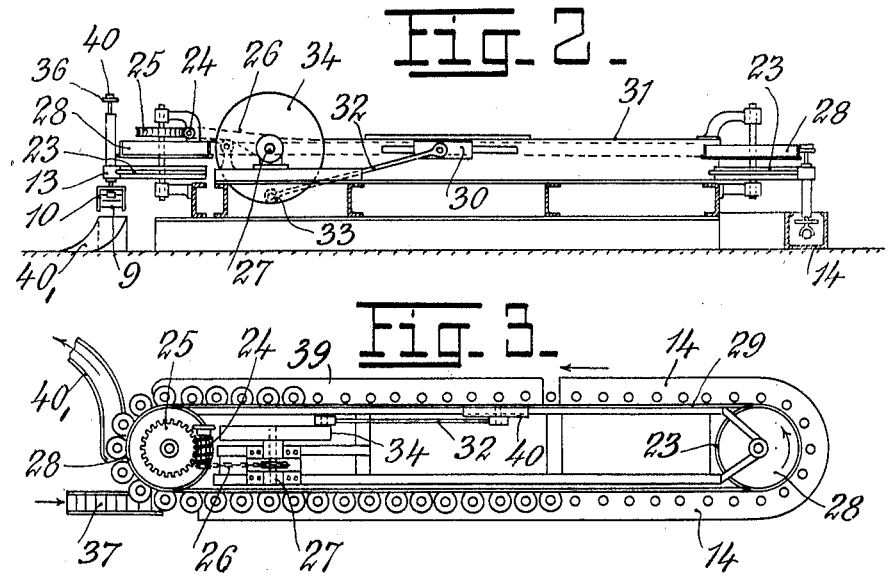
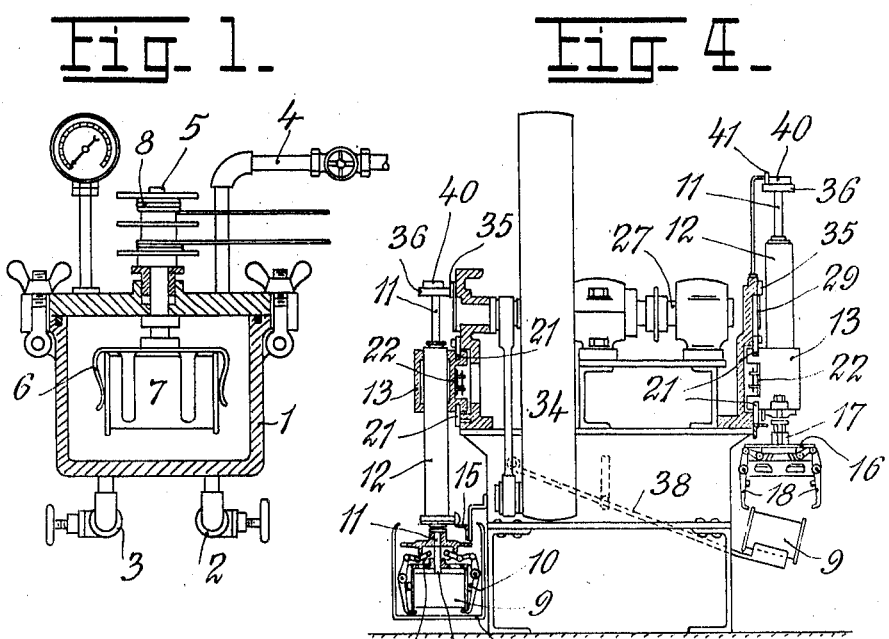

Patented July 6, 1926.

1,591,645

UNITED STATES PATENT OFFICE.

ROBERT RAFN, OF MOSS, NORWAY.

PROCESS FOR THE TREATMENT OF LIQUIDS CONTAINED IN CLOSED VESSELS.

Application filed November 3, 1923, Serial No. 672,694, and in Norway December 8, 1922.

In several industrial processes it is of importance to be able to produce rapid temperature changes in liquids contained in closed vessels, to which heat can only be supplied, or from which heat can only be removed by heat transmission through the walls of the vessel.

This problem is met with for example in the sterilization or Pasteurization of beer, milk and other liquid aliments contained in bottles, cans or other containers. In the production of canned milk (more especially unsweetened, evaporated or non-evaporated milk), in which the sterilization must be carried so far so as to secure destruction of all bacteria and spores, the necessary heating results in a radical alteration of the character of the product i. e. its consistency, flavor and colour. To obtain a keeping product it is usually necessary for the several milk products to be heated from 15-45 minutes at temperatures from 110-120°, whereby the heating or cooling takes place in accordance with curves, which have been determined by experience, and which have to be changed with the seasons and with the character of the raw material. The main point is of course to carry the heating only as far as is necessary to attain sterility.

It is known that a short heating to considerably higher temperatures for example 130-140° with subsequent rapid cooling renders the milk sterile. A necessary condition for this process is however that the milk is kept in rapid motion so as to pass the heating surfaces with high velocity, for instance by being pumped through narrow pipe systems and the like, so that no part of the milk is allowed to remain in contact with the heating surface sufficiently long to burn on the surface. Milk which has been sterilized in this manner retains its fresh flavor to an astonishing degree, and it is practically free from the cooked taste, which is the greatest drawback to the usual canned milk. In the case of milk which is hermetically enclosed in cans, bottles and the like this process appears to be inapplicable, and the usual sterilization methods, outlined above, are therefore also designed to bring about a slow transmission of heat through the more or less viscous liquid. To a very small extent this is facilitated by the usual, very slow, motion of the cans in the sterilizer. In the large mechanical sterilizers the entire contents are movable, but the turning is so slow that apparently only such a motion is produced which is caused by the change of position of the bubble of air in the can. Among the sterilizers on the market no one revolves with a greater velocity than 12-15 revolutions of the entire contents in a minute. It will be understood therefore that the currents thereby produced in the contents of each can will not in any way prevent the milk from burning upon the walls of the can when subjected to strong and rapid heating. As indicated in the literature however the object to be attained is only to bring about a slow mixing of the contents of the cans, and substantially to prevent the formation of skin, which otherwise is readily produced during the cooling operation.

Even if such a sterilizer is revolved as rapidly as its construction allows, the motion in the liquid will be so slight that it does not in any way permit of a rapid rise to high temperatures without detriment to the milk.

The present invention relates to a process whereby it is possible to produce very rapid temperature changes in liquids by transmission of heat through the walls of the vessels containing the liquid. By this process the vessels, during the transmission of heat to or from the liquid, are maintained in incessantly changing revolving motion, so that by utilizing the rotation momentum of inertia of the liquid there is brought about a constant energetic washing of the interior surfaces of the vessel.

The required changes in the motion may consist in changes of velocity or changes of direction or in a combination of several kinds of alterations of motion.

The axis about which the rotation takes place—the axis of rotation—may suitably be at an angle with an existing geometrical axis of rotation of the vessel (as for example the axis of a cylinder), and they may either intersect or not. The mechanical rotation may also be carried out upon an axis, the position of which relative to the container is changed steadily.

In order to produce, together with the said washing or flushing of the walls, an intimate mixing of the contents of the vessel, I preferably select an axis vertical upon the geometrical axis of the vessel, and in case of particularly sensitive products, when it is necessary to prevent the formation of a still corner at any place in the can, the axis of rotation may advantageously be situated under 45° with the geometrical axis. Besides the energetical twisting of the contents a rapid pulsation is then also obtained, which causes the contents to wash past at a high velocity even at the places which are near to the intersection points of the rotation axis with the surface of the can.

In its application for sterilization of milk the process may for example be carried out as follows:

The can which rests in a rotating basket is placed in a vessel into which heat is supplied by means of steam or water under pressure or any other medium. When the can is put into rapid rotation the body of liquid at first stands quite still and is then gradually brought into motion together with the can by friction and on account of the irregularity of the surfaces of the can, i. e. their deviation from true surfaces of rotation. After a certain number of revolutions the contents are practically in motion with the can. At the point of time when this condition is about half attained, the motion is quickly reversed, and the same operation is repeated and preferably continued during the entire heating and cooling operation, while when the temperature remains constant, the motion may cease. In this manner it is possible to effect complete sterilization in a course of a few minutes according to the character of the product without resulting in undesired changes in the character of the milk. It is further probable, that this rapid motion within the liquid in itself has a decided influence upon the sterilization for even at the temperatures at which milk is usually sterilized, viz, below 120° C., a few minutes suffice to destroy all germs, leaving the milk light of colour and fresh of taste.

This process dispenses with one of the most important objections to canned milk, viz, the alterations of the taste of the milk. As a consequence of this process will open a new field for the condensed milk.

In the accompanying drawing I have illustrated suitable apparatus for carrying out the invention.

In the drawing—

Fig. 1 is a vertical sectional view of a small apparatus for carrying out the process of sterilization on an experimental or small scale, e. g., with one can at a time;

Fig. 2 is a side elevation, partly in section, of a machine adapted to sterilize fluids in accordance with the invention automatically and on a commercial scale;

Fig. 3 is a plan view of the machine illustrated in Fig. 2; and

Fig. 4 is an end elevation of the machine shown in Fig. 2 somewhat enlarged, and certain of the parts being shown in section.

Referring to Fig. 1, the cast iron container 1 has a tight-fitting cover, secured with screws, an inlet for steam 2, an inlet for water 3 and a common outlet 4, each with a valve. The spindle 5 penetrates the cover in a packing box and has in its lower end a clasp 6, that holds the can 7. Its upper end has two pulleys 8 with laces for rotating the spindle some 3–7 turns in each direction. When the can has been secured in the clasp and the cover has been screwed down, the temperature of the heating medium, as water and steam, may be regulated as desired, while the spindle with the can is kept in motion or at rest as the process demands. By multiplying the number of spindles, each clasp carrying a row of cans, and rotating the spindles mechanically, a machine is obtained for treating a considerable number of cans simultaneously, for manufacturing purposes, which may be provided with suitable charging and discharging devices, pumps and containers for circulating and storing the hot and cold fluids and automatic temperature controlling apparatus. The capacity of such a sterilizer is large because of the short duration of the process.

Figs. 2, 3 and 4 show a machine suitable for sterilizing in a fluid of high boiling point under atmospheric pressure, for instance molten paraffine wax, which has proved very suitable for sterilizing several products. Here the can 9 is gripped by a mechanical clasp 10 on a spindle 11 rotating in bearings in a tubular holder 12, that may be raised and lowered in a sleeve 13, so as to immerse the can into the trough 14, that holds the heating medium. When the tubular holder 12 is raised by means of an inclined track 15, a disc 16 strikes the pins 17, depresses the links of the clasp mechanism and opens its fangs 18. In this position the clamp is locked, until a new can is raised into it and strikes the trigger 19, releasing the mechanism, which is closed again by the pressure of the spring 20. The fangs have protruding bosses, that relieve the can ends of internal pressure. The sleeves 13 slide horizontally on guides 21, running the whole length of the machine. These sleeves are riveted to links of an endless chain 22 running on large sprocket wheels 23 at both ends of the machine. When the sleeves leave the guides, they are carried by the chain, pressed against the flanges of the sprockets, until they enter between the guides on the rear side of the machine. The sprocket wheel at one end is driven by means of worm 24 and wheel 25 and a smaller sprocket and chain 26 operated from the main shaft 27. Idling on the shafts of the sprocket wheels are two pulleys 28 that carry a steel belt 29. The steel belt is riveted to a cross head 30 that slides in a slot in the main shaft 27. The upper third of the steel belt slides on the surface of the casting, where it has been planed correspondingly. On its outer side the belt has a narrow balata belt or a strip of brake lining 35 riveted to it for its entire length. The upper end of the spindle 11 that carries the can has a small steel friction wheel 36. When the spindle is approaching its lowest position, this wheel enters on the balata belt and receives from this a rotating motion which is reversed twice for each turn of the main shaft. When the spindle is raised, the motion ceases.

The spindle and clasp are brought into position for charge and discharge by a smaller pulley 40 at the top of the spindle, which has a segment cut out. When the spindle is in its highest position, a rail 41 is pressed yieldingly against the circumference of the pulley, turning it until the flat part comes against the rail, then it slides along in the proper position for discharge.

The heating fluid is circulated through a counter current heater, not shown, where the steam may be checked by an accurate thermo-regulator. The cooling water is circulated similarly, and the hot water from the trough may be utilized for preheating the cans. The immersion into the hot end of the cooling trough, under rotation, removes most of the adhering heating fluid from the surface of the can.

The operation of the machine is as follows: The foremost can on the feed track 37 is raised by the elevator 38 operating from the sprocket 23 into the fangs of the clasp 10, that closes as the can touches the trigger. Spindle and can are lowered into the trough of heating fluid and receive from the steel belt an alternating rotation. After the desired period the can is raised, and as it travels continuously forward is lowered into the trough 39 of cooling water. Finally it is raised into the highest position and released into the discharge track 40'.

Claims:

1. Process for treatment of liquids contained in a closed vessel to produce rapid temperature changes by heat transmission through the walls of the vessel, in which the vessels during the transmission of heat are maintained in a rotating incessantly changing motion, so that by utilizing the momentum of inertia of rotation of the liquid a constant energetic washing of the interior surface of the vessel is produced.

2. Process according to claim 1 in which the motion is a frequently changed rotation about an axis which is at an angle with the geometrical rotation axis of the vessel.

3. The process of sterilizing fluid substances in containers which comprises heating the same for a short time at a relatively high sterilizing temperature, spinning the container during the heating and periodically reversing the direction of the spinning.

4. The process of sterilizing milk in containers which comprises heating the same for a relatively short time at about 120° C., imparting angular movement to the container during the heating and periodically reversing the direction of the angular movement.

In testimony that I claim the foregoing as my invention, I have signed my name.

ROBERT RAFN.